United States Patent
Kurzweil

(10) Patent No.: US 9,336,774 B1
(45) Date of Patent: May 10, 2016

(54) PATTERN RECOGNIZING ENGINE

(71) Applicant: Google Inc., Mountain View, CA (US)

(72) Inventor: Raymond C. Kurzweil, Newton, MA (US)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/868,048

(22) Filed: Apr. 22, 2013

Related U.S. Application Data

(60) Provisional application No. 61/635,952, filed on Apr. 20, 2012, provisional application No. 61/656,095, filed on Jun. 6, 2012, provisional application No. 61/718,778, filed on Oct. 26, 2012.

(51) Int. Cl.
*G10L 15/00* (2013.01)
*G10L 15/08* (2006.01)

(52) U.S. Cl.
CPC .................................. *G10L 15/083* (2013.01)

(58) Field of Classification Search
None
See application file for complete search history.

(56) References Cited

U.S. PATENT DOCUMENTS

| | | | | |
|---|---|---|---|---|
| 4,783,804 A * | 11/1988 | Juang | ...................... | G10L 15/14 704/245 |
| 5,381,513 A * | 1/1995 | Tsuboka | ....................... | 704/232 |
| 5,608,840 A * | 3/1997 | Tsuboka | .............. | G06K 9/6226 704/236 |
| 5,912,989 A * | 6/1999 | Watanabe | ................ | G10L 15/08 382/215 |
| 7,505,893 B2 * | 3/2009 | Mizutani | ............... | G06F 17/289 704/2 |
| 7,613,675 B2 | 11/2009 | Hawkins et al. | | |
| 7,620,608 B2 | 11/2009 | Jaros et al. | | |
| 7,624,085 B2 | 11/2009 | Hawkins et al. | | |
| 7,693,853 B2 * | 4/2010 | Bellamy | ........... | G06F 17/30985 382/101 |
| 7,739,208 B2 | 6/2010 | George et al. | | |
| 7,899,775 B2 | 3/2011 | George et al. | | |
| 7,904,412 B2 | 3/2011 | Saphir et al. | | |
| 7,937,342 B2 | 5/2011 | George et al. | | |
| 7,941,389 B2 | 5/2011 | Marianetti, II et al. | | |
| 7,941,392 B2 | 5/2011 | Saphir | | |

(Continued)

FOREIGN PATENT DOCUMENTS

EP 0 570 479 10/2001
WO WO 2011/095342 8/2011

OTHER PUBLICATIONS

Bui et al., "Hierarchical Hidden Markov Models with General State Hierarchy," *Proceedings of the National Conference in Artificial Intelligence*, 2004, 324-329.

(Continued)

*Primary Examiner* — Richemond Dorvil
*Assistant Examiner* — Thuykhanh Le
(74) *Attorney, Agent, or Firm* — Fish & Richardson P.C.

(57) ABSTRACT

Methods, systems, and apparatus, for pattern recognition. One aspect includes a pattern recognizing engine that includes multiple pattern recognizer processors that form a hierarchy of pattern recognizer processors. The pattern recognizer processors include a child pattern recognizer processor at a lower level in the hierarch and a parent pattern recognizer processor at a higher level of the hierarchy, where the child pattern recognizer processor is configured to provide a first complex recognition output signal to a pattern recognizer processor at a higher level than the child pattern recognizer processor, and the parent pattern recognizer processor is configured to receive as an input a second complex recognition output signal from a pattern recognizer processor at a lower level than the parent pattern recognizer processor.

25 Claims, 10 Drawing Sheets

(56) References Cited

U.S. PATENT DOCUMENTS

| | | | |
|---|---|---|---|
| 7,983,998 B2 | 7/2011 | George et al. | |
| 8,037,010 B2 | 10/2011 | Jaros et al. | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 2001/0051871 A1* | 12/2001 | Kroeker | G06Q 30/02 704/249 |
| 2003/0014250 A1* | 1/2003 | Beigi | G10L 17/02 704/238 |
| 2004/0107059 A1* | 6/2004 | Happel | G06K 9/481 702/76 |
| 2006/0072679 A1* | 4/2006 | Chen | H04B 1/0003 375/261 |
| 2007/0005531 A1* | 1/2007 | George | G06N 3/08 706/16 |
| 2007/0061758 A1* | 3/2007 | Manson | G06F 17/212 715/853 |
| 2007/0162282 A1* | 7/2007 | Odinak | G10L 15/30 704/255 |
| 2007/0185714 A1* | 8/2007 | Kim | G10L 15/08 704/254 |
| 2008/0219565 A1* | 9/2008 | Hattori | G06K 9/6256 382/224 |
| 2008/0243515 A1* | 10/2008 | Odinak | G10L 15/30 704/270.1 |
| 2008/0270338 A1* | 10/2008 | Adams | G06K 9/00986 706/48 |
| 2009/0271095 A1* | 10/2009 | Kojima | F02N 11/0814 701/113 |
| 2010/0121643 A1* | 5/2010 | Mohajer | G10L 15/05 704/254 |
| 2010/0299135 A1* | 11/2010 | Fritsch | G06F 17/2785 704/9 |
| 2011/0093269 A1* | 4/2011 | Braho | G10L 15/08 704/251 |
| 2011/0131040 A1* | 6/2011 | Huang | B60R 16/0373 704/231 |
| 2011/0170527 A1* | 7/2011 | Yamamoto | H04W 56/0015 370/338 |
| 2011/0307433 A1* | 12/2011 | Dlugosch | G06F 15/17362 706/45 |
| 2011/0307503 A1* | 12/2011 | Dlugosch | G06K 9/00973 707/758 |

OTHER PUBLICATIONS

Djurfeldt et al., "Brain-scale simulation of the neocortex on the IBM Blue Gene/L supercomputer," *IBM J Res. & Dev.*, Jan./Mar. 2008, 52(1/2):31-41.

Fine et al., "The Hierarchical Hidden Markov Model: Analysis and Applications," Machine Learning, 1998, 32:41-62.

Schwartz, "On the Pattern Classification of Structured Data using the Neocortex-inspired Memory-prediction Framework," Master's Thesis—University of Southern Denmark, 2009, 131 pages.

* cited by examiner

PATTERN RECOGNIZING ENGINE

CROSS-REFERENCE TO RELATED APPLICATIONS

This application claims the benefit under 35 U.S.C. §119 (e) of the filing date of U.S. Patent Application No. 61/635,952, for "Computer System Based on Modeling of the Neocortex," which was filed on Apr. 20, 2012, No. 61/656,095, for "Computer System Based on Modeling of the Neocortex," which was filed on Jun. 6, 2012, and No. 61/718,778, for "Computer System Based on Modeling of the Neocortex," which was filed on Oct. 26, 2012. Application No. 61/718,778 is incorporated here by reference.

BACKGROUND

This specification relates to pattern recognition and pattern recognizer processors.

The Internet provides access to a wide variety of resources, such as image files, audio files, video files, and web pages. Pattern recognition systems can be used to identify patterns in these resources and performs tasks based on the identified patterns. For example, a speech recognition system can be used to recognize patterns in audio files and convert those audio files into text-based representations. The text-based representations can be used for a variety of different tasks, including electronic document generation and search system interaction.

SUMMARY

This specification describes systems that generate, configure, and use a pattern recognizing system that includes a dynamic hierarchy of connected pattern recognizer processors. These pattern recognizer processors may be configured in an initial topology using one or more techniques. For example a combination of a genetic algorithm technique and a hidden Markov model technique can be used to determine an initial topology for the pattern recognizers.

The initial topology may define a general relationship between the pattern recognizers. For example, outputs of one or more pattern recognizers can be used as inputs of other pattern recognizers. The initial topology can include one or more parameters that can be used for pattern matching, including weights regarding patterns at a lower level of the hierarchy and an expected variability of the size of the lower level pattern. For example, in a speech recognition context, a first level of the hierarchy can recognize individual phonemes, like [a], [b], and [n]. The second level of the hierarchy may recognize words such as "Anna" and "Abba." And a third level of the hierarchy may recognize the phrase "Abba rocks." In this context, for example when recognizing the word "Abba" at the second level of the hierarchy, recognizing the two phonemes [b][b] is likely more important, and therefore likely given more weight than recognizing the phoneme [a] at the beginning or end of either of the words at the second level of the hierarchy.

In general, innovative aspects of the subject matter described in this specification can be embodied in data processing systems that include a pattern recognizing engine, where the pattern recognizing engine includes multiple pattern recognizer processors that form a hierarchy of pattern recognizer processors, the pattern recognizer processors including a child pattern recognizer processor at a lower level in the hierarch and a parent pattern recognizer processor at a higher level of the hierarchy, where the child pattern recognizer processor is configured to provide a first complex recognition output signal to a pattern recognizer processor at a higher level than the child pattern recognizer processor, and the parent pattern recognizer processor is configured to receive as an input a second complex recognition output signal from a pattern recognizer processor at a lower level than the parent pattern recognizer processor. Other implementations of this aspect include corresponding methods and computer programs encoded on computer storage devices.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

In general, other innovative aspects of the subject matter described in this specification can be embodied in data processing systems that include a pattern recognizing engine, where the pattern recognizing engine includes multiple pattern recognizer processors configured to dynamically form a hierarchy, each pattern recognizer processor being implemented on a processing device having memory and storage, each pattern recognizer processor being configured with recognition software that when executed recognizes specific patterns; a hidden Markov model processor subsystem configured to control production of new levels of hierarchy as needed and to prune connections, wherein producing new levels and pruning connection is done at least in part by adjusting connection weights between pattern recognizer processors; and one or more input processors configured to receive inputs and to bootstrap the pattern recognizing engine with previously trained hierarchical networks.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
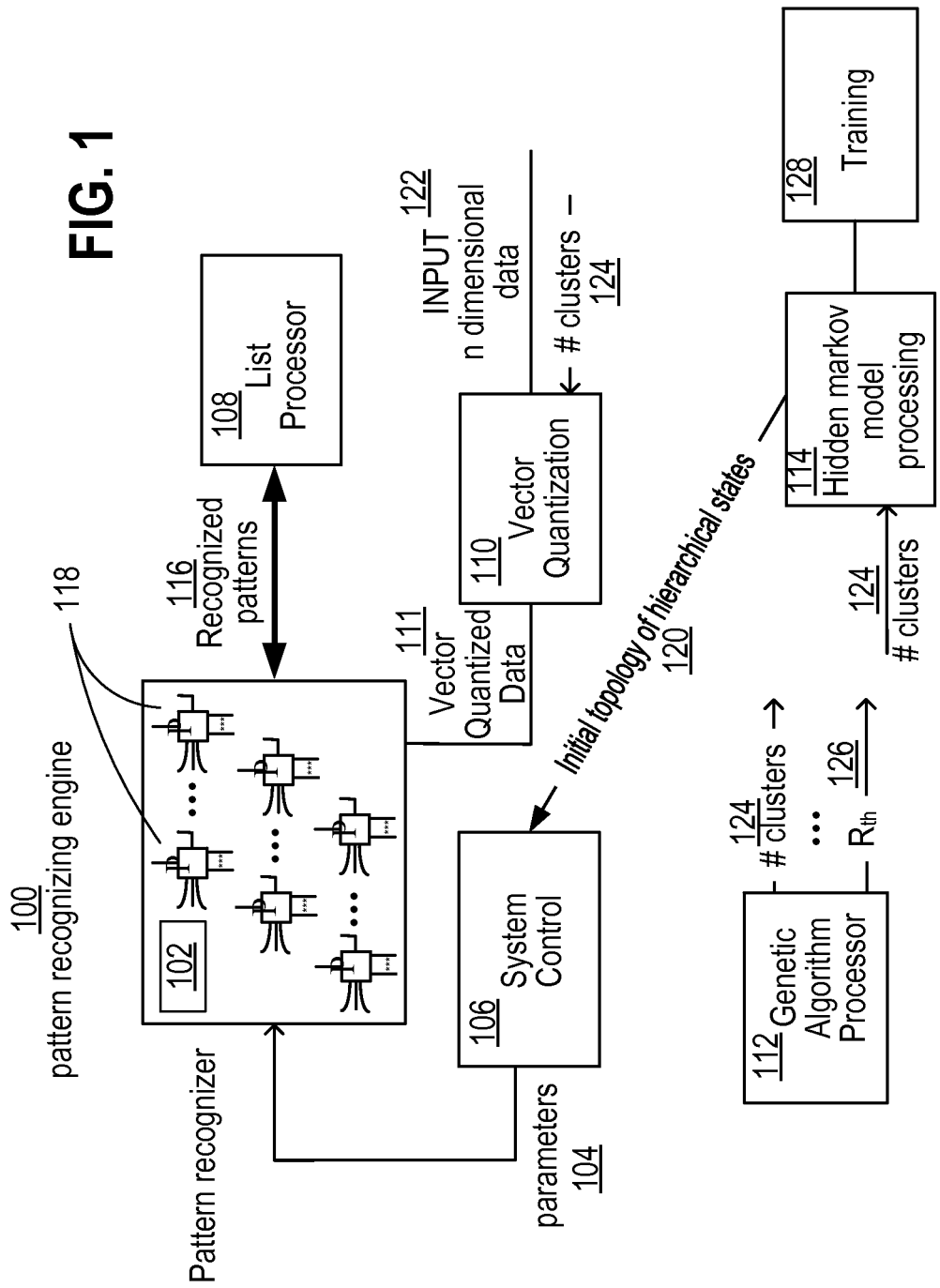
FIG. 1 shows an example pattern recognizing engine.

FIG. 1 shows an example pattern recognizing engine 100. The engine 100 can be used for a number of different tasks including pattern recognition, pattern prediction, and other types of learning. For example, in a speech recognition context, a system that includes a pattern recognizing engine 100 may not be explicitly told that there are forty-four phonemes in English, the sequences of vectors that are likely for each phoneme or what phoneme sequences are more likely than others. Instead, the system may discover these "rules" by learning from human speech data. That is, the processor can determine through a learning process that there are forty-four phonemes in English, for example.

The pattern recognizing engine 100 can include a pattern recognizer 102, a system control 106, a list processor 108, a vector quantization processor 110, a genetic algorithm processor 112, and a hidden Markov model processor 114. The engine can include, or have access to, training data 128. The engine and any of its components can be implemented as individual components or as common components and may also be implemented in either a centralized or a distributed fashion. The engine and its components can be implemented in or as any kind of data processing apparatus.

In general operation, the pattern recognizer 102 can receive one or more parameters 104 and determine one or more patterns from the received parameters. In some implementations, the pattern recognizer 102 can receive the parameters 104 from the system control 106 and send recognized patterns 116 to the list processor 108. These recognized patterns can be used for a variety of tasks including speech recognition and skill learning. In some implementations, the pattern recognizer 102 includes a plurality of pattern recognizer processors 118 that can dynamically form a hierarchy.

In some implementations, each pattern that is recognized by the pattern recognizing engine 100 is composed of three parts. A first part may be an input, which includes lower level patterns in a hierarchy of patterns that are included in the particular pattern to be recognized. For example, a pattern that matches a word, such as "steep" may receive inputs from a lower level in the hierarchy that correspond to the phonemes [s], [t], [E], and [p] that form the word "steep." In some implementations, each of these lower level patterns do not need to be repeated for each higher-level pattern in which they are referenced. For example, many of the patterns for words will include the letter "A." Each of these patterns does not need to repeat the description of the letter "A" but will use the same pattern recognizer.

A second part of each pattern may be the pattern's name. As used herein, the "name" of a pattern is simply an output from a particular pattern recognizer that indicates that a pattern as been matched. In some implementations, this output may be produced by a simulated axon. In those implementations, it is this simulated axon that is the pattern's name. For example, a pattern recognizer that recognizes the word "steep" has a simulated axon that when generating an output indicates that the pattern named "steep" has been recognized. A third part of each pattern may the set of higher level patterns that it is referenced by the particular pattern. For example, in the speech recognition context, phonemes are referenced by patterns that recognize words. The patterns that recognize words may in-turn be referenced by patterns that recognize phrases, sentences, or more complex lingual structures.

The system control 106 can be implemented as software-controlled data processing apparatus that can be used to provide one or more parameters 104. In some implementations, the system control 106 can receive an initial topology of hierarchical states 120 from the hidden Markov model processor 114. This initial topology can specify a starting or default behavior for the system control 106. For example, the initial topology may be used to specify one or more parameters 104 that the system control 106 selects and provides to the pattern recognizer 102. In some implementations, this initial topology is modified over time as the pattern recognizing engine 100 learns from attempting to recognize various patterns. The topology can be modified, for example, by the genetic algorithm processor 112.

The list processor 108 can be implemented as software-controlled data processing apparatus. The list processor 108 can receive one or more recognized patterns from the pattern recognizer 102, generate a corresponding list from the recognized patterns and store the list. A pattern can be represented as a list, in which each item in the list is another pattern in the hierarchy, which may also be represented as a list, until the lowest level patterns are represented. In some implementations, a recognized pattern can be used to step through multiple lists simultaneously to provide the equivalent of a structured thought. A list may be a statement of the constraints that a solution to a problem must satisfy. To illustrate, consider a situations where the system is trying to identify a particular object. Constraints may include that the object is white, spherical, with a circumference of 9 to 9.25 inches and a weight between 5 and 5.25 ounces. Each step can generate a recursive search through an existing hierarchy of patterns or a search through available literature, such as a collection of electronic documents. For example, the spherical constraint may match a number of different patterns, such as baseball, softball, soccer ball, and bowling ball, whereas the weight constraint may only match a pattern for a baseball. By performing a recursive search, a system using a pattern recognizing engine 100 can identify the object as a baseball.

The vector quantization processor 110 can be implemented as software-controlled data processing apparatus. The vector quantization processor 110 can be used to iteratively reduce a data set. For example, continuing with the ball example, data representing a baseball, basketball, football, soccer ball, bocce ball, bowling ball, billiard and other balls used in recreational activities can be provided to the vector quantization processor 110. With other types of patterns, such as in speech recognition content, the number of data points may be orders of magnitudes larger. Each data point may be a vector of numbers representing a point in a possibly high dimensional space. The data points 122 can be processed into small number of clusters, e.g., 1,024 clusters. Each cluster can be represented by one vector which is at a geometric center of all the points in that particular cluster. The vector quantization processor 110 can cluster the data points using any conventional technique, e.g., a k-means clustering analysis that assigns each point to one of k clusters that has a closest mean.

Once the vector processor 110 has processed the data 122 into clusters, the clusters can be represented by their respective center points. The vector quantization processor 110 can then assign a number to each cluster. For example, if there are 1,024 clusters, the clusters can be assigned cluster numbers 124 in the range of 0 to 1,023. If, for example, a new input vector arrives, the input can be assigned a vector number of the cluster whose center point is closest to this new input vector.

Using the stored cluster numbers 124, the vector quantization processor 110 can generate a table, such as vector quantized data 111, with the distance of the center point of every cluster to every other center point. Thus, when a new input vector is received, the pattern recognizing engine 100 can quickly determine the distance of this new input vector to every other cluster. In other words, since the vector quantization processor 110 represents points by their closest cluster, the vector quantization processor 110 can quickly determine the distance of this point to any other possible point that might be received by the pattern recognizing engine 100.

The quantization of the input data may offer a number of different advantages. For example, the complexity of the input data can be reduced. As another example, n-dimensional data can be reduced to one-dimensional data. As yet another example, the capacity of a system using a pattern recognizing engine 100 to find invariant features can be increased because the engine 100, in quantizing the data, emphasizes portions of the space that convey the most information. That is, in the speech recognition context, combinations of frequencies are physically impossible or at least very unlikely so there is little reason to give equal space to unlikely combinations of inputs as to likely ones. This can also reduce the data to equally likely possibilities. As yet another example, a system using engine 100 can use one-dimensional pattern recognizers even though the original data may have many more dimensions.

The genetic algorithm processor 112 can be implemented as software-controlled data processing apparatus. The genetic algorithm processor 112 can use conventional genetic algorithm-based techniques to update one or more initial parameters that are used by the engine 100. The genetic algorithm processor 112 can also be used to find optimized solutions to particular problems. For example, in the case of a speech recognition system, the genetic algorithm processor 112 can be used to evolve or otherwise modify an initial topology of the network and other parameters, such as parameters 104. As another example, if the problem is optimizing the design parameters for a circuit, then an initial list of all of the parameters (with a specific number of bits assigned to each parameter) that characterize the circuit can be provided to the genetic algorithm processor 112. Here, this initial list of parameters is regarded as the genetic code in the genetic algorithm.

The genetic algorithm processor 112 can randomly generate thousands or more genetic codes. Each such genetic code (which may represent one set of design parameters) is considered a simulated "solution" organism. The genetic algorithm processor 112 can evaluate each simulated organism in a simulated environment by using a defined method to evaluate each set of parameters.

For example, if the genetic algorithm 112 is attempting to optimize the execution of a program, the genetic algorithm processor 112 may execute a program defined by the particular parameters (or genetic code) and evaluate the generated program on appropriate criteria. For example, the genetic algorithm processor 112 may evaluate the program based on whether the program completes the task, how long the program takes to execute, and so on. The best solution organisms (here, the best programs) are allowed to survive and the rest are eliminated. In some implementations, this evaluation is a factor to the success of a genetic algorithm. That is, poorly evaluated simulated organisms can lead to poor optimization performance.

The genetic algorithm processor 112 may also cause each of the survivor solution organisms to multiply themselves until there is a same number of solution creatures as in a prior iteration. In some implementations, this can be done by simulating sexual reproduction. In other words, the genetic algorithm processor 112 can create new solutions where each new solution draws part of its genetic code from one parent and another part from a second parent. It is generally sufficient to generate an offspring from two arbitrary parents. As these simulated organisms multiply, the genetic algorithm processor 112 may mutate one or more portions of the genetic code using a random number generator or other randomization techniques.

The genetic algorithm processor 112 may repeat these steps any number of times. At the end of each generation the genetic algorithm processor 112 can determine how much the designs have improved. For example, the genetic algorithm processor 112 can compute the average improvement in the evaluation function over all of the surviving organisms. In some implementations, when the improvement in the evaluation of the surviving solution organisms from one generation to the next becomes very small, the genetic algorithm processor 112 may stop this iterative cycle of improvement. Then, the genetic algorithm processor 112 may select the best parameters 126 corresponding to the best surviving solution in the last generation as an optimized solution.

The hidden Markov model processor 114 can be implemented as software controlled data processing apparatus. The hidden Markov model processor 114 can also be used to refine aspects of pattern recognition, such as for speech recognition. In general operation, the hidden Markov model processor 114 can compute one or more probabilities for each transition in a hierarchy based on an observable output, where for example, the hierarchy includes a linear sequence of states but at least some of the states cannot be examined or are otherwise hidden.

For example, in the context of a speech recognition system, the hidden Markov model processor 114 can receive a plurality of human speech samples, apply the hidden Markov model technique to infer a hierarchy of states with connections and probabilities, and then use this inferred hierarchical network of states to recognize new utterances. In some implementations, to create a speaker independent system, the hidden Markov model processor 114 can receive speech samples from many different speakers. Such an approach may also be used to train the hidden Markov models.

In some implementations, a system using the hidden Markov model processor 114 can prune unused connections so as to essentially adapt a topology that more closely mirrors one or more aspects of one or more patterns used by the system. In some implementations, the hidden Markov processor 114 can use data that has been processed by the vector quantization processor 110.

For example, in a speech recognition context, the hidden Markov model processor 114 may start with vector quantized data that includes all the state transitions that are possible in a particular language. The hidden Markov model processor 114 can then process one or more sample utterances one by one. For each sample utterance, the hidden Markov model processor 114 can iteratively modify the probabilities of the transitions to better reflect the input sample that was just processed. That is, the hidden Markov processor 114 can code the likelihood that specific patterns of sound are found in each phoneme, how the phonemes influence each other, and the likely orders of phonemes. The system can also include probability networks on higher levels of language structure, such as the order of words, the influence of phrases, and so on up the hierarchy of language.

In some implementations, the hidden Markov model processor 114 can perform additional operations. For example, the hidden Markov processor 114 can make perturbations or small random changes to the received input. Another example includes allowing adjacent Markov models "leak" into each other by causing the results of one Markov model generated by the hidden Markov model processor 114 to influence other generated models that are "nearby" in the hierarchy.

By using a combination of the genetic algorithm processor 112 and the hidden Markov model processor 114 the pattern recognizing engine 100 can be trained to recognize patterns, such as speech patterns. For example, once the system is trained, the engine 100 can recognize speech by considering the alternative paths through the pattern recognition hierarchy and pick a path that is most likely given the actual sequence of input vectors that is received by the engine 100.

In other words, if the pattern recognizing engine 100 identifies a sequence of states that is likely to have produced that utterance, the engine 100 can conclude that the utterance came from that sequence. In some implementations, these sequences may also include language labels, such as English or Chinese, and other labels. In addition, in some implementations, the engine 100 can improve results by continuing to train while the engine 100 is being used for recognition. For example, weights in the pattern recognizer 102 can be modified over time based on received patterns. As another example, dynamic changes to portions of the hierarchy can be accomplished by re-connecting portions of one level of a hierarchy to portions of another level of the hierarchy based on changes in the weights and or probabilities of obtaining certain results.

The pattern recognizing engine 100 can be bootstrapped with previously trained hierarchical networks that have already been trained to a particular hierarchical level, for example, trained in recognizing human speech, printed characters, or natural language structures. The previously learned levels would provide a relatively stable basis to learn the next level. The system can process training data, e.g., read a set of documents, over and over, gaining pattern recognizer processors at higher levels with each new iteration of processing.

The pattern recognizing engine 100 can optionally include a "critical thinking" module to perform a continual background scan of all of the patterns reviewing their compatibility with the other patterns recognized by the engine 100. Upon identifying an inconsistent pattern, the system would begin a search for a resolution. The search would include its own structural and pattern data and literature available to the engine 100. A resolution may simply mean finding that one of the inconsistent patterns is simply incorrect (as indicated by being contraindicated by a preponderance of other patterns). More constructively it would find a pattern at a higher conceptual level that resolves the apparent contradiction by providing a perspective that explains each pattern. The system would add this resolution as new patterns and link to the patterns that triggered the search for the resolution in the first place. This critical thinking module can be a continually running background task.

Figure 2:
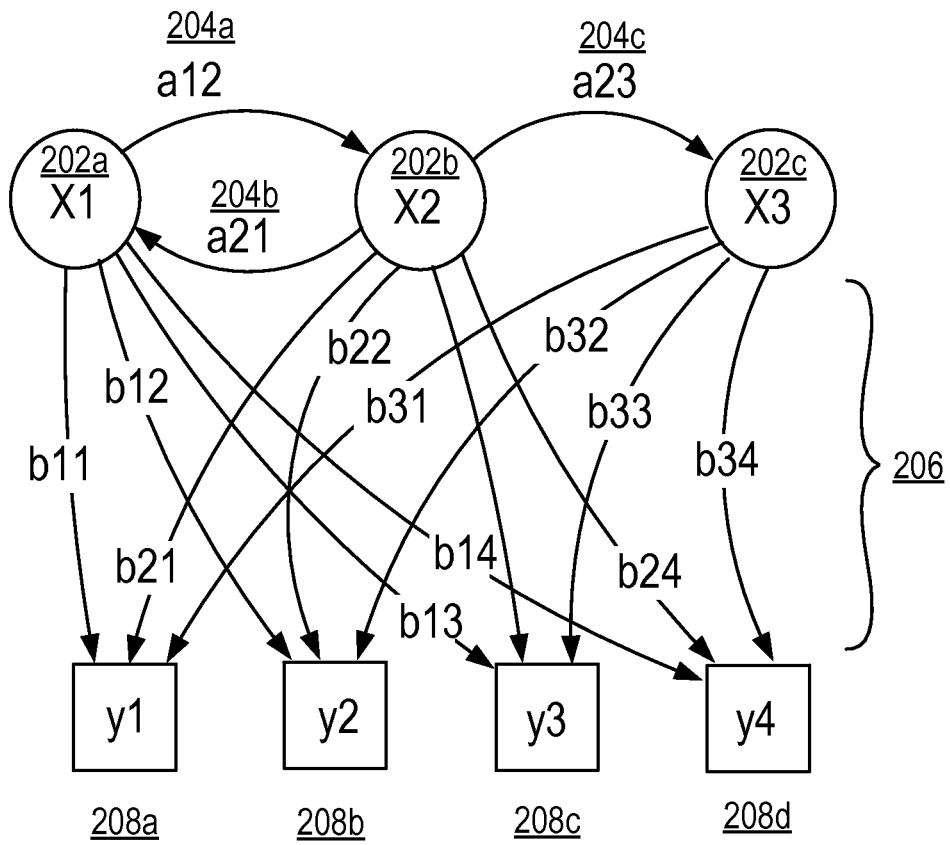
FIG. 2 shows an example layer of a hidden Markov model.

FIG. 2 illustrates an example layer of a hidden Markov model. Nodes 202a, 202b, and 202c represent "hidden" internal states. Nodes 208a, 208b, 208c, and 208d represent both actual outputs or results as well as predicted outputs or results. Transitions 204a, 204b, and 204c represent the probability of going from one internal state to another internal state. Transitions in the group 206 represent the probability of transitioning from one of the internal states to one of the outputs. Such a model may be determined using the hidden Markov model processor 114, as described above. For example, the hidden Markov model processor 114 can receive information corresponding to nodes 208a-208d and construct the other aspects of the hidden Markov model including nodes 202a-202c, transitions 204a-204c, and the group of transitions 206 using a hidden Markov model technique.

Figure 3:
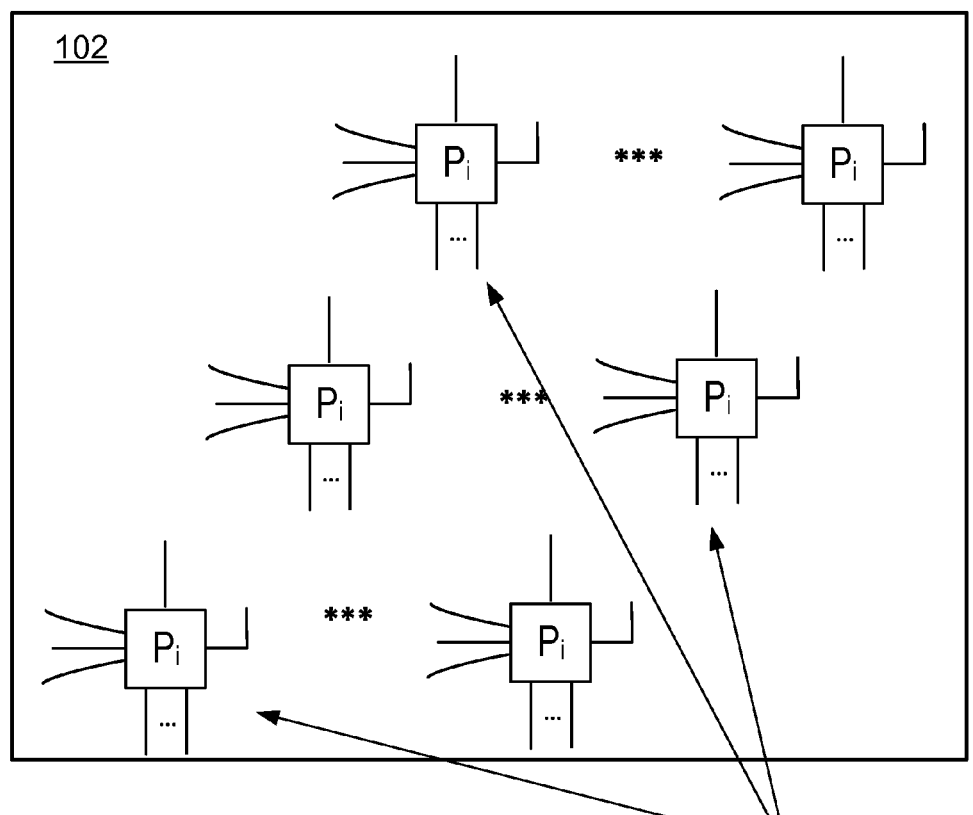
FIG. 3 shows an example pattern recognizer processor.

FIG. 3 illustrates an example pattern recognizer 102. The pattern recognizer 102 includes a plurality of pattern recognizer processors 302. In some implementations, the pattern recognizer 102 includes as many pattern recognizer processors 302 as can be supported by available memory and computational resources.

The pattern recognizer processors 302 can be configured dynamically to form a hierarchy. For example, in some implementations, any of pattern recognizer processors 302 can implement a hidden Markov model. A pattern recognizer processor together with a parent pattern recognizer processor to which it has a connection is also a hidden Markov model. Parent and child pattern recognizer processors are described in more detail below. Any two pattern recognizer processors that are connected is a hidden Markov model and the probabilities within the two processors and between the two processors can be trained together.

In some implementations, new patterns at one level higher than the current highest level in the hierarchy can be proposed, and recognizers for the proposed patterns can be set up, based on patterns that are identified that include one of the patterns at the highest level of the hierarchy. This can be done by a separate module of the pattern recognizing engine 100 (FIG. 1), e.g., the hidden Markov model processor 114 (FIG. 1), that tabulates recognized patterns, in particular including patterns recognized at the highest level, based on real world input to the engine, and sets up even higher level recognizers for patterns that appear often enough. For example, in a speech recognition context having only one hierarchical level corresponding to the forty-four English language phonemes, new patterns corresponding to words constructed of these phonemes can be processed, learned, and later recognized. Then a third level of the hierarchy corresponding to phrases that include the recognized words can be added, and so on.

If the pattern is identified again, the probability of this being a real pattern rather than an artifact, e.g., a random set that does not represent a pattern that is likely to occur on a regular basis, is increased. The pattern recognizer 102 can continually compute the probability of each new hypothesized pattern being a real rather than an artifact. In some implementations, this probability estimate may be based on Bayes theorem. In some implementations, the probability estimate may also be based on an analysis of all the patterns the pattern recognizer 102 has identified to date at every level in the hierarchy.

In some implementations, the pattern recognizer 102 can determine how to compute this probability based on which hypothesized patterns became patterns that can be recognized by the pattern recognizer 102. Consider, for example, the phrases "go" and "to," which may each be recognized by a corresponding recognizer. The pattern recognizer 102 can determine, for example, to allocate a new pattern recognizer processor for a hypothesized pattern "go to" and may base the determining at least in part on determining a frequency of occurrence of the hypothesized pattern.

In some implementations, the pattern recognizer processors 302 can "wire" themselves to other pattern recognizer processors 302 up and down the conceptual hierarchy by making software-implemented connections using links or memory pointers.

Figure 4:
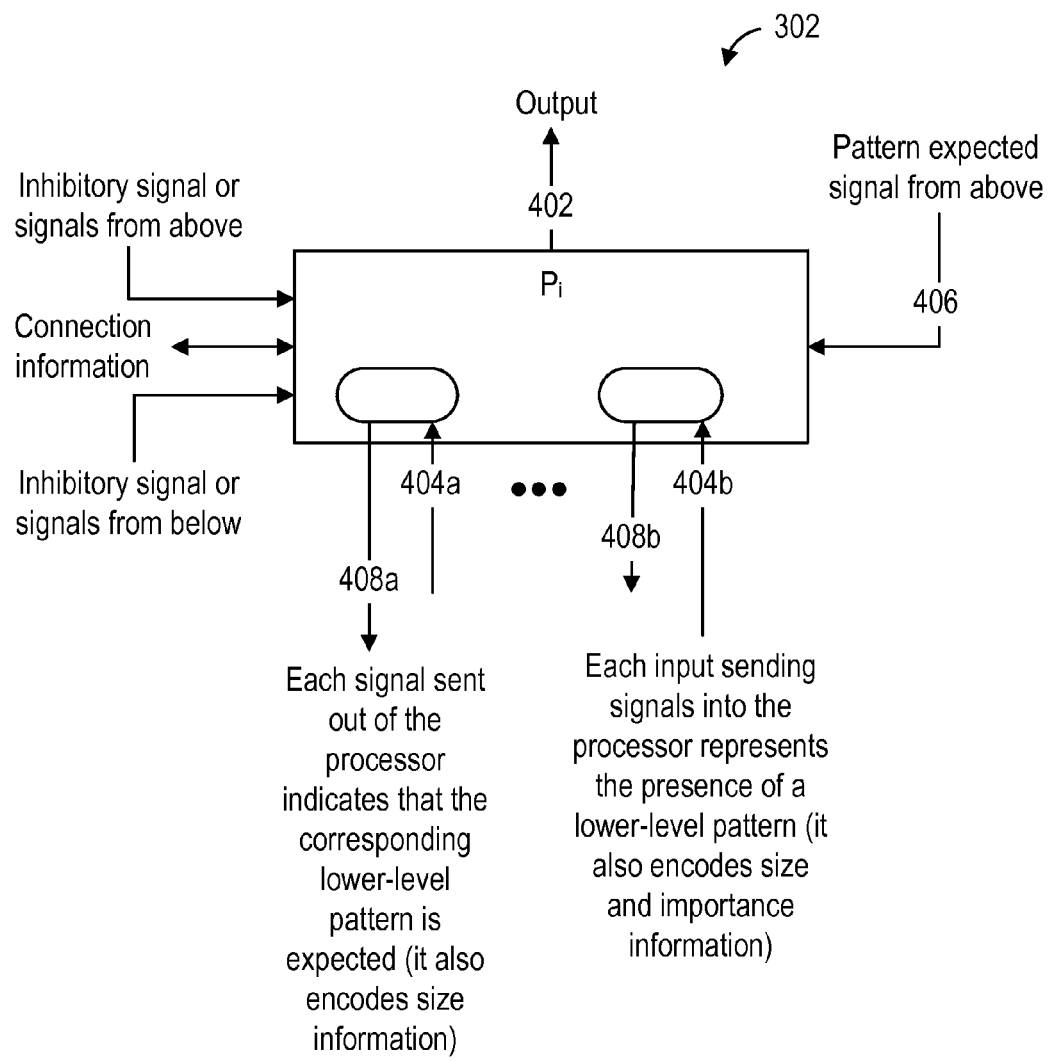
FIGS. 4-5 show example patter recognizer processors.

FIG. 4 illustrates an example pattern recognizer processor 302. In general, the pattern recognizer processor 302 can be configured as a combination of software and hardware (e.g., the hardware shown in reference to FIG. 5) or implemented entirely in software. In some implementations, the pattern recognizer processor 302 can include a simulated axon to approximate the behavior of a neuron. Each pattern recognizer processor 302 can accept a linear sequence of inputs and trigger its simulated axon if a threshold value is satisfied. This threshold can be one of the parameters that can be optimized using the genetic algorithm processor 112, as described above. That is, if the threshold is met, the particular pattern recognizer processor 302 recognizes a particular pattern, even if only some of the inputs are recognized. For this reason, the pattern recognizer processor 302 can be configured for auto-associative recognition, that is, recognizing a pattern based on only part of the pattern being present. In some implementations, the pattern recognizer processor 302 can also be configured to generate inhibitory signals, which are signals that indicate that the pattern is less likely.

By way of example, each processor 302 includes a recognition model for one or more patterns for which the processor 302 can recognize. In some implementations, a weight for each input indicating how important that input is to the recognition is also stored in the model. As mentioned above, the pattern recognizer processor 302 has a threshold for producing an output signal. This output signal may indicate that this pattern recognizer processor 302 has successfully recognized the pattern for which it is configured.

Not every input pattern has to be present for a recognizer processor 302 to produce a recognition output signal. For example, the processor 302 may still produce an output signal 402 if an input with a low weight is not matched. The processor, however, may be less likely to produce an output signal if a high importance input is not matched. According to particular implementations, when the processor 302 generates an output signal, the processor 302 is indicating a probable presence of the one or more patterns for which the processor 302 is configured.

In other words, a successful recognition by a processor 302 may involve counting input signals that are activated with a count weighted by an importance parameter and also evaluating the size of each input, e.g., based on a domain or dimension. In some implementations, the size parameter for each input can indicate the expected size of the input for a particular size or dimension, and also can indicate how variability of that size.

For example, consider a processor configured to recognize the word "steep." In such a configuration, the [t] and [p] phonemes may both have a very short expected duration as well as a small expected variability. That is, the expectation is not to hear long t's and p's. The [s] phoneme may have a short expected duration but a larger variability because it is possible to drag out the [s] sound. The phoneme [E] may have a long expected duration as well as a high degree of variability.

In the above example, the "size" parameter refers to a temporal duration, but time is only one possible dimension. At much higher levels of abstraction, the processors 302 may recognize patterns with all sorts of continuums, such as levels of attractiveness, irony, happiness, frustration, and a myriad of others. In some implementations, these types of parameters can be provided by human experts. For example, linguists who can determine the expected durations of different phonemes, can provide duration and variability information. In some implementations, the parameters may also be discovered by an artificial intelligence (AI) system (e.g., a machine learning system) using training data to discover the parameters. In some implementations, a hybrid approach can also be used. For example an initial set of parameters can be provided by human experts and then an AI system can automatically refine the initial parameters estimates using a learning process from real examples of speech.

The pattern recognizer processor 302 can compute a probability that the pattern that it is responsible for recognizing is in fact currently represented by its active inputs. That is, the processor 302 can compute a likelihood based on all of the processor's 302 history recognizing patterns. In some implementations, each particular input 404a, 404b to a particular processor 302 is active if a corresponding lower level pattern recognizer processor 302 is producing an output signal, meaning that that lower level pattern was recognized. Each input 404a, 404b also encodes the observed size (on some appropriate dimension such as temporal duration or physical magnitude or other continuum) so that the size can be compared (to the stored size parameters for each input) by the pattern recognizer processor in computing the overall probability of the pattern. The stored parameters in the processor 302 for each input 404a, 404b can also encode a weight (importance) of the corresponding lower level pattern and an expected variability of the size of the corresponding lower level pattern.

The pattern recognizer processor 302 can compute the overall probability that the pattern is present given (i) the inputs 404a, 404b, e.g., each with an observed size, (ii) the stored parameters relating to size, e.g., the expected size and the variability of size, for each input, and (iii) the parameters of the importance of each input using a mathematical method such as a hierarchical hidden Markov model for learning these parameters and then using them to recognize hierarchical patterns.

The pattern recognizer processor 302 can compute the overall probability that the pattern is present given (i) the inputs 404a, 404b, e.g., each with an observed size, (ii) the stored parameters on size, e.g., the expected size and the variability of size, for each input, and (iii) the parameters of the importance of each input, using a mathematical method such as a hierarchical hidden Markov model for learning these parameters and then using them to recognize hierarchical patterns.

In some implementations, the simulated axon of a pattern recognizer processor can deliver a more complex output, e.g., one that includes one or more of the following, a probability value or a probability value quantized to discrete levels, a bundle of probability values, or one or more quantized vectors representing magnitude, importance parameters or other values. The number of quantized probability value levels can be two or more than two. In such implementations, the inputs 404a, 404b would include the data provided by such simulated axons.

There can be more than one such axon from a child pattern recognizer processor to a parent pattern recognizer processor. For example, multiple children processors may be connected to parent pattern recognizer processor, as illustrated in FIG. 4. If there is more than one simulated axon, each simulated axon can be connected to a different place in the parent processor, i.e., can provide input to a different part of the model implemented by the parent processor. There can be multiple sets of axons with each set going to a different parent processor, and to parent processors at different levels. The data communicated from a high level pattern recognizer processor to a lower level processor can indicate that a pattern is expected and can be one or more of the same list, i.e., a probability value, a probability value quantized to discrete levels, the number of levels can be two or more than two, a bundle of probability values, and one or more quantized vectors representing magnitude, importance parameters and other values.

In some implementations, the pattern recognizer processor can show recognition of the pattern by sending an active signal up the simulated axon of the particular pattern recognizer processor. This axon can be connected to one or more pattern recognizer processors at the next higher conceptual level in the hierarchy. All of the pattern recognizer processors connected in this way to a particular pattern recognizer processor can accept the recognized pattern as one of the pattern recognizer processors' inputs.

In some implementations, pattern recognizer processors can also send signals 408a, 408b down to one or more pattern recognizer processors at lower conceptual levels in the hierarchy whenever most of a pattern has been recognized indicating that the rest of the pattern is "expected." The signals 408a, 408b can also include size information. In some implementations, each pattern recognizer processor can have one or more pattern expected signal input channels 406. When a pattern expected signal 406 is received in this way, indicating that the sending process has determined that the pattern is likely to be present, the threshold for recognition of this pattern recognizer processor is lowered. That is, when a pattern expected signal is received the pattern recognizer processor is more likely to recognize the pattern.

As mentioned above, each input includes an importance parameter and one or more size parameters. The pattern recognizer processor can apply a recognition program to the inputs from the lower levels, taking in to consideration inhibitory signals and expectation signals to recognize pattern based on a threshold that varies according to expectation signal(s) and inhibitory signals(s). In some implementations, when a pattern recognizer processor receives an inhibitory signal the recognition threshold is raised, but it is still possible for the pattern to be recognized if other patterns are still present. In some implementations, the pattern recognizer processor can processes received input according to the importance parameter and size parameters associated with the input.

In some implementations, a pattern recognizer processor may generate an output signal if the more important inputs are met (in comparison to less important inputs) and if the inputs are of expected size and size variability. That is, in such circumstances, the pattern recognizer processor can generate an output for a higher level pattern recognizer processor in the hierarchy. A pattern recognizer processor can also generate outputs for a corresponding pattern recognizer processor at the higher level in the hierarchy that receives as inputs new importance, size, determined subsequent inhibitory signals, and expectation signals.

Figure 5:
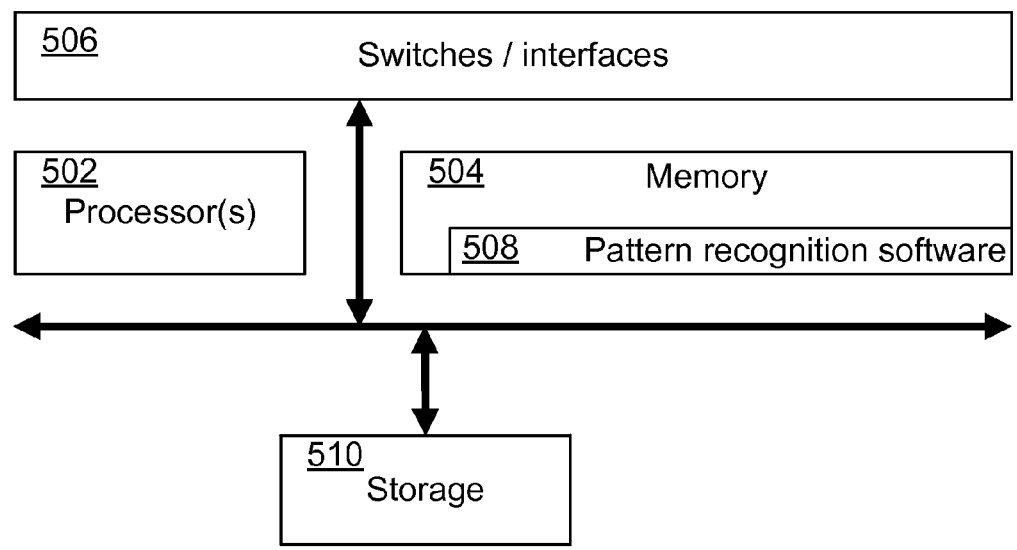

FIG. 5 shows an example hardware configuration for a pattern recognizer processor. The example hardware configuration can include one or more processors 502, memory 504, one or more switches and interfaces 506, and additional storage 510.

The one or more processors 502 can be single cores, multi cores, controllers, or other processors. The memory 504 be read-only memory (ROM) or random-access memory (RAM). The one or more processors 502 can include an input/output interface coupled to the memory 504. A pattern recognition software 508 can be stored in the memory 504. The one or more processors 502 can include an input/output interface to, e.g., other pattern recognizer processors, via switches, networks, buses fabrics, and other components. The pattern recognizer processor can also include more permanent storage devices 510, such as solid state storage or other flash memory.

Figure 6:
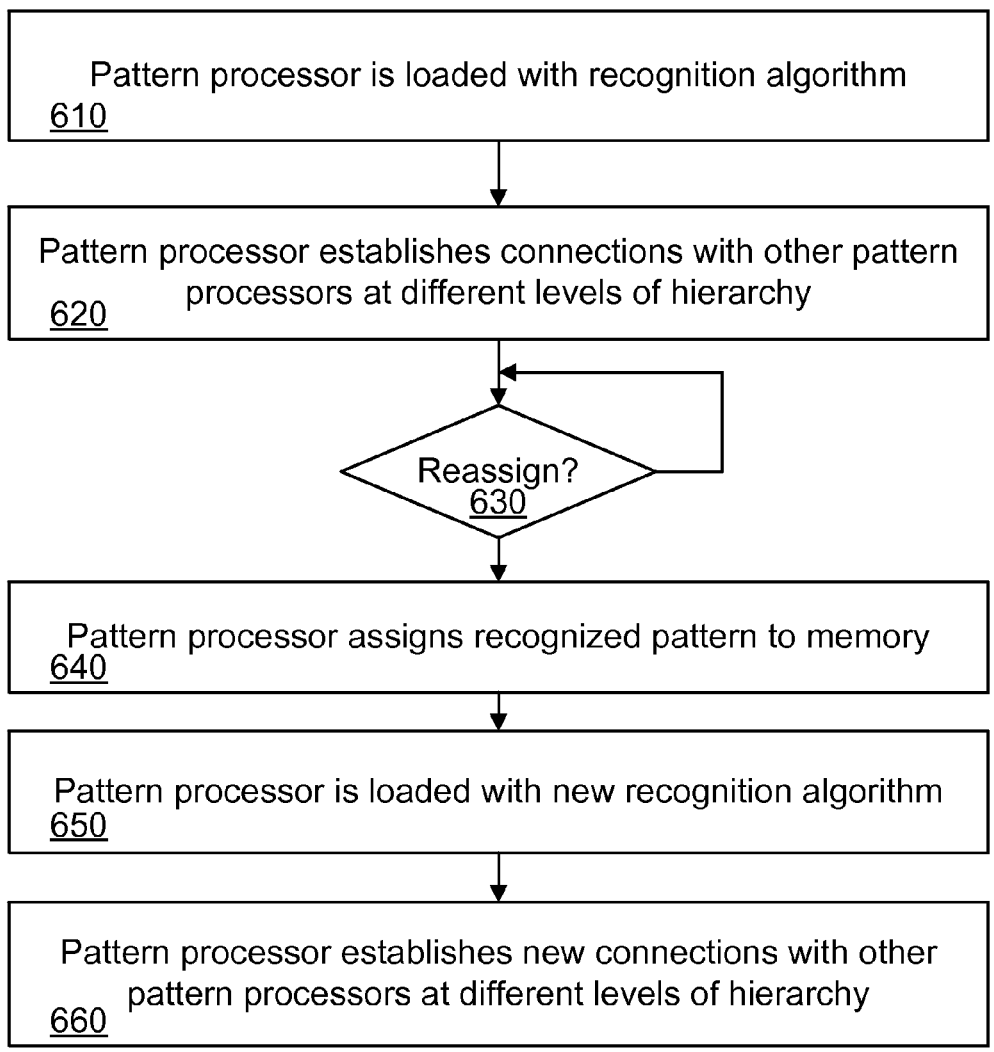
FIG. 6 is a flow chart showing an example technique for initializing one or more pattern recognizer processors.

FIG. 6 is a flow chart showing an example method for initializing one or more pattern recognizer processors. In general, the method can be used to initially configure one or more pattern recognizer processors and reconfigure relationships between one or more other pattern recognizer processors according to received patterns. For convenience the method will described in reference to a pattern recognizing engine, although other systems and processors can configured to perform the method.

The engine loads a pattern recognizer processor with pattern recognition software (610). For example a pattern recognizer processor 302 can be loaded to recognize the phoneme [s]. In some cases, the software can include or be derived from human expert data, data determined by an AI learning processes, or some combination of them.

The engine causes the patter recognizer processor to establish connections with other pattern recognizer processors at different levels of a hierarchy (620). For example, the processor can perform a hidden Markov technique to establish connections between different pattern recognizer processors.

The engine determines whether to reassign the pattern recognizer processor. For example, the engine can determine that pattern recognizer processors should learn more recent material instead of being configured to recognize older patterns (630).

If the engine determines that a pattern recognizer processor should be reassigned, the engine assigns, stores, or otherwise backs-up the old recognized pattern to memory (640). In some implementations, the engine performs the preceding steps on a particular pattern recognizer processor after an old recognized pattern in the processor is stored to memory.

For example, the engine loads a pattern recognizer processor with a new pattern recognition algorithm software (650). For example a pattern recognizer processor 302 can be loaded to recognize the phoneme [E]. In some cases, the algorithm software can include or be derived from human expert data, data determined by an AI learning processes, or some combination of them.

The engine causes the patter recognizer loaded with the new pattern recognition algorithm software processor to establish connections with other pattern recognizer processors at different levels of a hierarchy (650). For example, the processor can perform a hidden Markov technique to establish connections between different pattern recognizer processors.

Figure 7:
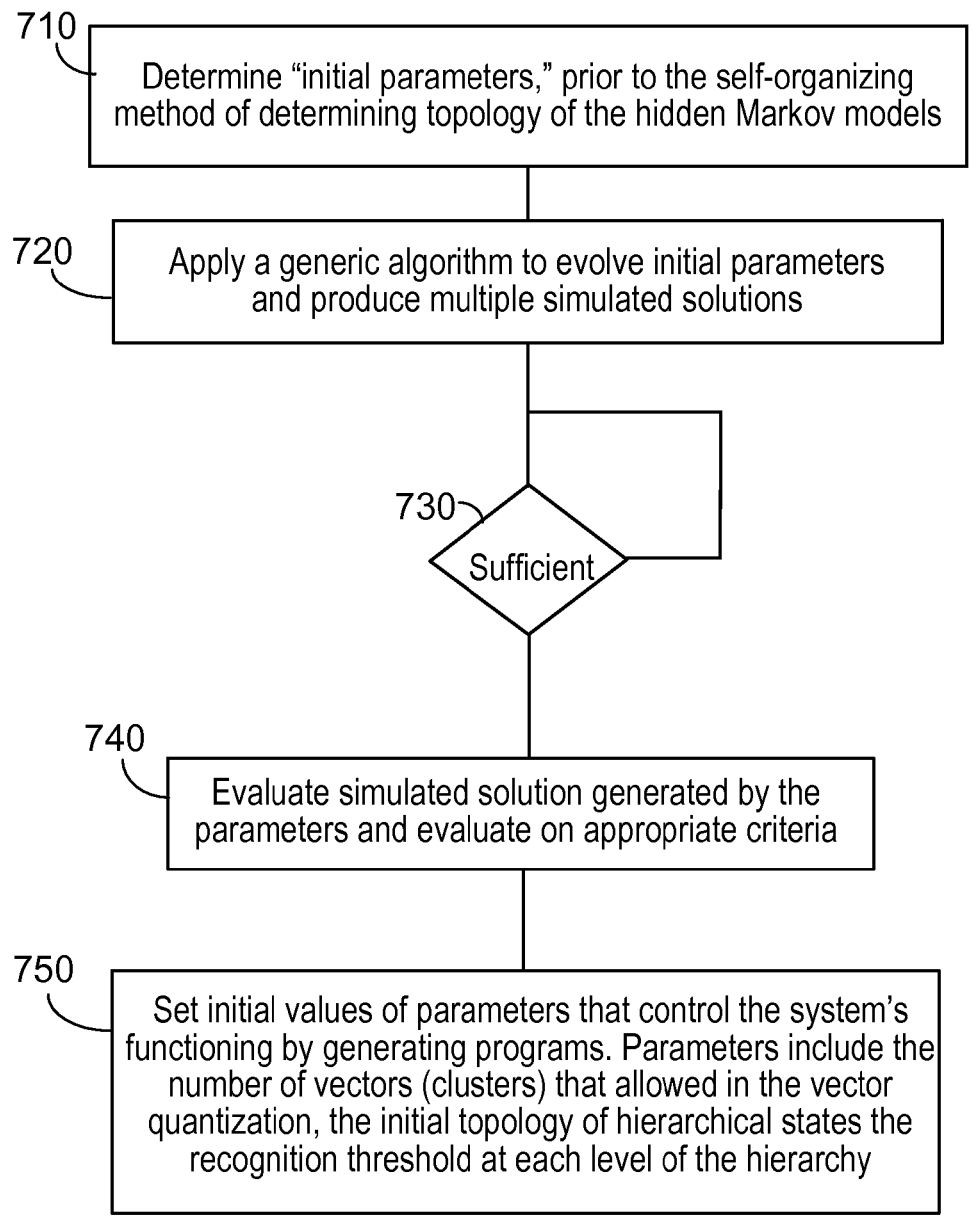
FIG. 7 is a flow chart showing an example genetic algorithm.

FIG. 7 is a flow chart showing an example method implementing a genetic algorithm. For convenience the example method is described in reference to a genetic algorithm processor 112 (FIG. 1), although other systems and processors can be configured to perform the method.

The genetic algorithm processor determines an initial set of parameters (710). In some implementations, this can occur prior to performing a self-organization method of determining a topology of the hidden Markov models, described in reference to FIG. 8. For example, the genetic algorithm processor can receive a data set and determine the parameters that are relevant in describing that data set.

The genetic algorithm processor applies a genetic algorithm to evolve the initial parameters to produce multiple simulated solutions (720). For example, the genetic algorithm processor can generate a plurality of random "genetic codes" that represent a set of parameters. Then, in an iterative fashion, the genetic algorithm processor can select survivors based on an analysis of the parameters and generate offspring from pairs of the selected survivors.

The genetic algorithm processor determines whether the improvement generation-over-generation is sufficient (730). For example, the genetic algorithm processor can determine an amount by which one generation has improved over a previous generation. If the increment is below a threshold, the genetic algorithm processor may proceed to the next step. Otherwise, the genetic algorithm processor can continue to perform some or all of the preceding steps.

The genetic algorithm processor evaluates a simulated solution generated by the parameters based on appropriate criteria (740). For example, in a program context, the genetic algorithm processor can evaluate whether the program performs a particular task and a speed at which the task is performed. One or more of these simulated solutions may be selected, according to particular implementations.

The genetic algorithm processor sets initial values of parameters that are used to control the function of a recognition system, based on the parameters of the selected simulated solution (750). In some implementations, the parameters can include the number of clusters generated by a vector quantization processor, an initial topology of hierarchical states, and a recognition threshold at level of the hierarchy, for example.

Figure 8:
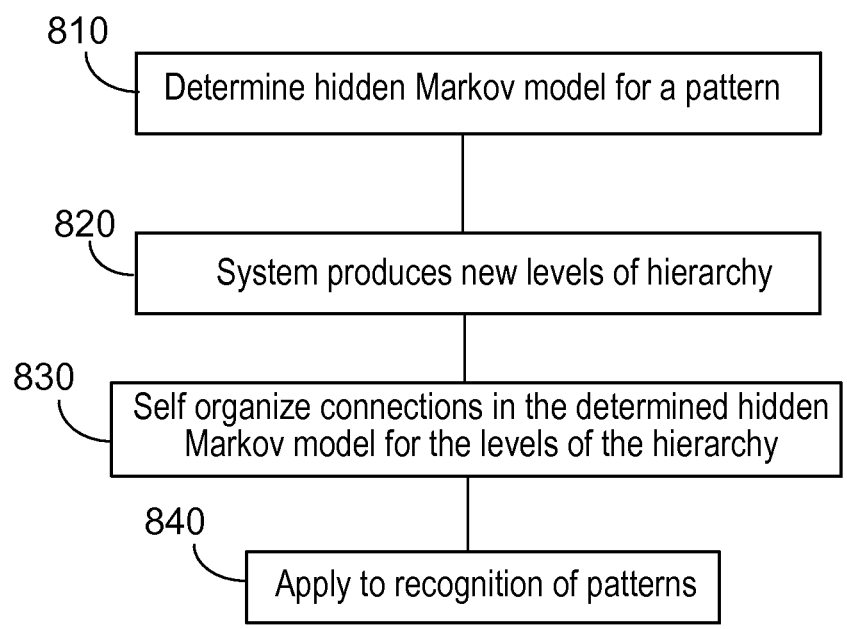
FIG. 8 is a flow chart showing an example technique for dynamically assigning connections for new pattern recognizer processors.

FIG. 8 is a flow chart showing an example method for dynamically assigning connections for new pattern recognizer processors. For convenience, the method is described in reference to a pattern recognizing engine and a hidden Markov model processor, although other systems and processors can be configured to perform the method.

The hidden Markov model processor determines a hidden Markov model for a pattern (810). For example, one or more known or expected outputs can be received and a hidden Markov technique can be applied to generate a hidden Markov model.

The hidden Markov model processor generates a new level of the hierarchy (820). For example, in a speech recognition context, a first level of the hierarchy corresponding to individual phonemes can be used to generate a second level of the hierarchy that can recognize words, where each word includes combinations of the individual phonemes in the first level of the hierarchy. In some implementations, this step can be performed more than once, depending on the particular patterns to be recognized. For example, in a speech recognition context, a third level of the hierarchy can be generated that can recognize phrases, where each phrase includes combinations of words from the second level of the hierarchy.

The hidden Markov model processor self-organizes connections for the level of the hierarchy (830). For example, the hidden Markov model processor can perform a hidden Markov technique to generate one or more weighted transitions between one or more portions of each level of the hierarchy. In some implementations, the hidden Markov model processor can automatically prune connections in the hierarchy with connections weights below a certain threshold. In some implementations, the hidden Markov model processor can also be configured to allow new connections in the hierarchy to be made to better model the training data and to learn in a dynamic manner.

The pattern recognizing engine uses the self-organized connections to recognize patterns (840). For example, as described above, one or more parameters can be provided to a hierarchy of pattern recognizer processors that can be used to recognize patterns. In some implementations, this hierarchy of pattern recognizers processors is specified according to the output of preceding steps.

Figure 9:
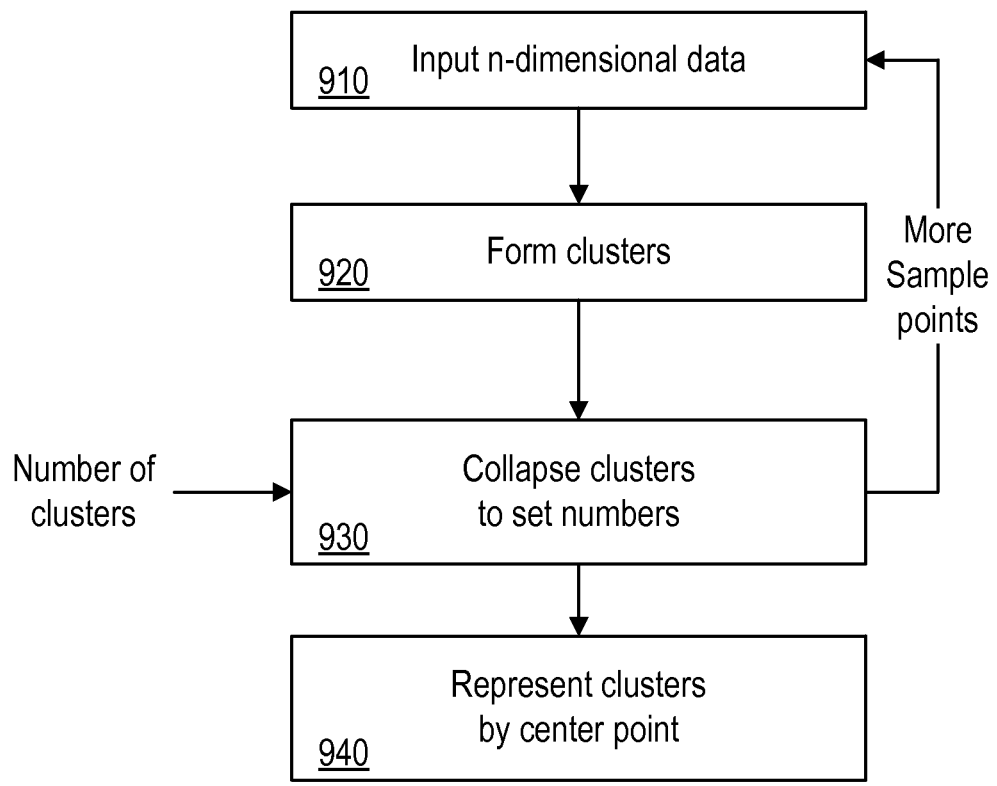
FIG. 9 is a flow chart showing an example technique for quantizing data.

FIG. 9 is a flow chart showing an example method for quantizing data. For convenience the technique is described in reference to a vector quantization processor, although other systems and processors can be configured to perform the method.

The vector quantization processor receives n-dimensional data (910). For example, in the speech recognition context, the vector quantization processor may receive a number of dimensions of frequency data.

The vector quantization processor forms clusters (920). For example, the vector quantization processor can assign the at least some of the data points in the received n-dimensional data as a respective cluster. That is, if the vector quantization processor is configured to generate 1,024 clusters, the vector quantization processor can assign the first 1,024 data points as the 1,024 clusters, respectively.

The vector quantization processor collapses clusters to a set number (930). For example, the vector quantization processor can select a first data point and a second data point that are closer together than other data points and combine them into a single cluster. In some implementations, this step is performed as additional data points in the n-dimensional data are processed. For example, if there are 1024 clusters, this step can be performed when a 1025th data point is being processed.

Preceding steps continue until all of the data points in the n-dimensional data have been processed. The vector quantization processor represents the clusters by a center point (940). For example, the center point defines a smallest distance between all of the data points represented by a particular cluster.

Figure 10:
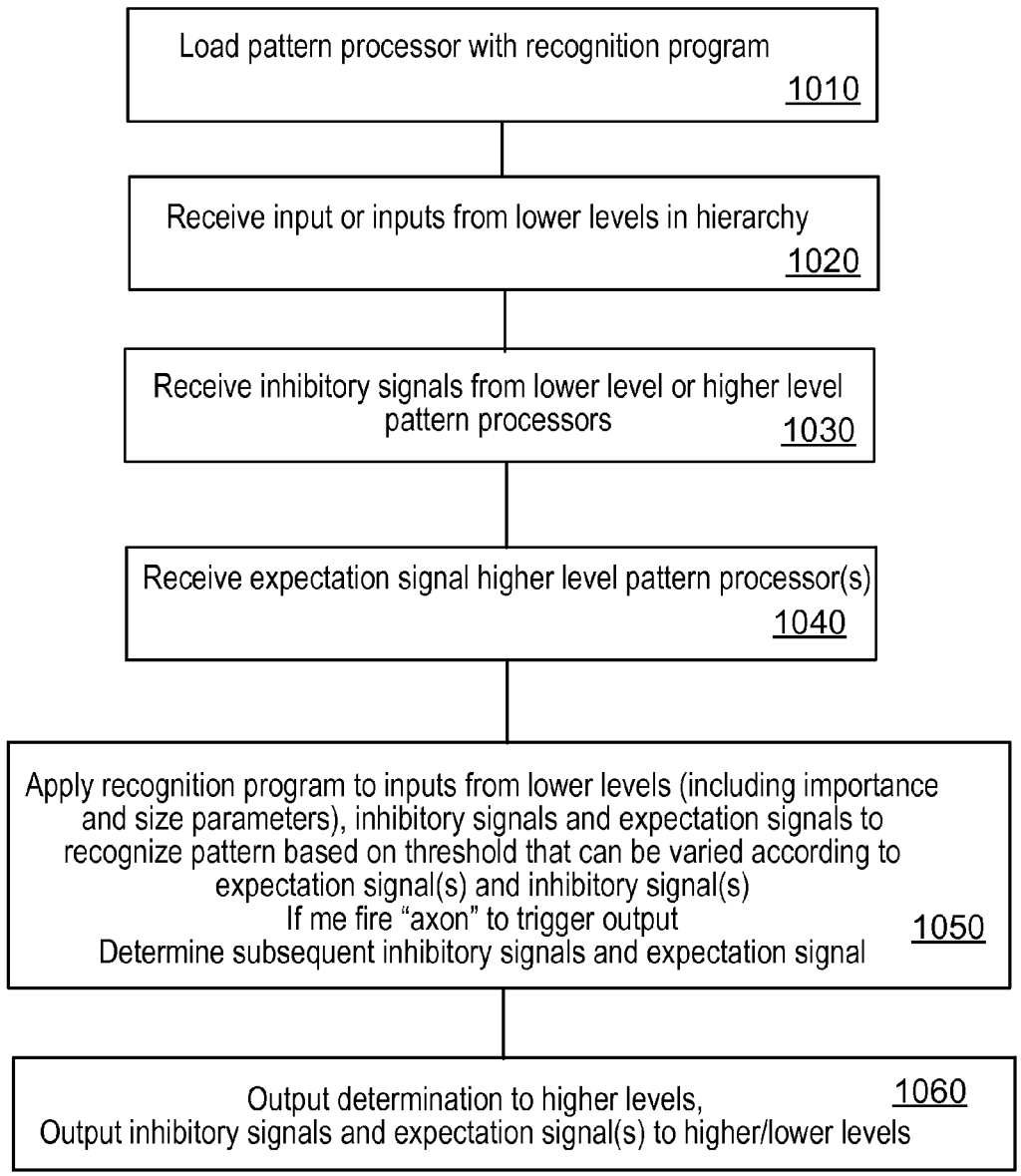
FIG. 10 is a flow chart showing an example technique for recognizing a pattern using a plurality of pattern recognizer processors.

FIG. 10 is a flow chart showing an example method for recognizing a pattern using a plurality of pattern recognizer processors. In general, the method uses a computed probability that a particular pattern has been recognized and provides that determination to other pattern recognizer processors that are connected to form a hierarchy. For convenience the method is described in reference to a pattern recognizing engine and pattern recognizer processors, although other systems and processors can be configured to perform the method.

The pattern recognizing engine loads pattern recognizer processors with a recognition program (1010). For example, the pattern recognizer processors can be loaded with a program that is generated using a genetic algorithm. This program can be used to recognize one or more patterns.

The pattern recognizer processors receive one or more inputs from pattern recognizer processing from lower levels in a hierarchy (1020). For example, in the speech recognition context, pattern recognizer processors at a level in a hierarchy that corresponds to words in a spoken language can receive inputs from a lower level in the hierarchy that corresponds to individual phonemes of the spoken language. In some implementations, these inputs correspond to successful pattern recognitions performed at appropriate levels of the hierarchy. For example, if a pattern in the second level of the hierarchy corresponds to a word "steep," the corresponding pattern recognizer processors may receive one or more inputs from pattern recognizer processors at a lower level that are configured to recognize the phonemes [s], [t], [E], and [p].

The pattern recognizer processors receive inhibitory signals from a lower level or a high level from pattern recognizer processors in the hierarchy (1030). For example, in a person identification context, recognition of a mustache at a lower level in the hierarchy may be received by a pattern recognizer processer that recognizes women to reduce the likelihood that the person to be recognized is a woman. As another example, if a person is recognized to be on a trip at a higher level of the hierarchy, such a recognition may inhibit that person from be recognized at a lower level of the hierarchy for a particular pattern recognizer processor attempting to recognize someone in a line (because it is likely that someone recognized in one location is somewhere else).

The pattern recognizer processors receive an expectation signal from higher level pattern processors (1040). For example, in the speech recognition context, if a pattern recognizer processor that recognizes the pattern "Abba rocks" has received input from the pattern recognizer that recognizes the phrase "rocks," the pattern recognizer processor may send an expectation input to the pattern recognizer processor that recognizes the word "Abba" because there is at least some level of expectation the pattern "Abba rocks" is about to be recognized (and therefore, there is at least some likelihood that the pattern recognizer processor will recognize the word "Abba" as additional patterns are processed).

Each of the pattern recognizer processors determine whether a pattern has been recognized (1050). For example, each pattern recognizer processor can receive the inputs received from lower and higher levels of the hierarchy including inhibitory signals, expectations signals, importance parameters, size parameters and other signals. Then each of the pattern recognizer processors can execute a recognition program that is loaded on the particular pattern recognizer processor and that uses the received inputs to make a recognition determination.

That is, in some implementations, the loaded program can be used to determine whether the received inputs satisfy a threshold. For example, the presence and absence of inputs and their corresponding weights can be combined to compute a threshold score. If the threshold is satisfied, the pattern recognizer processor can output a signal on a respective simulated axon to provide inputs to one or more other pattern recognizer processors in the hierarchy. In some implementations, the presence or absence of an output signal can be used to determine subsequent inhibitory signals and expectation signals that can be sent to other pattern recognizer processors in the hierarchy, e.g., as described above in preceding steps.

The pattern recognizer processors output the recognition determination of preceding steps to higher levels in the hierarchy (1060). For example, a pattern recognizer processor that recognizes the phoneme [E] can provide an output signal on a simulated axon to a pattern recognizer processor at a higher level in the hierarchy that can recognize the word "steep," if the phoneme [E] is recognized.

The method can be performed any number of times as output determinations are provided to higher levels of the hierarchy. In this way, simple pattern recognitions can be used to recognize much more complicated patterns. For example, phoneme recognizers can be used to recognize words, which can be used to recognize phrases, and so on, until particular quotes and other more complicated speech patterns can be recognized.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any invention or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A data processing system comprising:
a pattern recognizing engine, comprising:
multiple pattern recognizer processors that form a hierarchy of pattern recognizer processors, the pattern recognizer processors including a child pattern recognizer processor at a lower level in the hierarchy and a parent pattern recognizer processor at a higher level of the hierarchy,
where the child pattern recognizer processor is configured to provide a first complex recognition output signal to a pattern recognizer processor at a higher level than the child pattern recognizer processor,
where the parent pattern recognizer processor is configured to receive as an input a second complex recognition output signal from a pattern recognizer processor at a lower level than the parent pattern recognizer processor,
where each of the multiple pattern recognizer processors is configured to recognize a respective pattern and is implemented in a respective data processing apparatus comprising one or more processors and memory storing pattern recognition instructions that when executed by the one or more processors cause the pattern recognizer processor to recognize the respective pattern that the pattern recognizer processor has been configured to recognize,
where each pattern recognizer processor has one or more simulated axons that each have a respective probability threshold, and each pattern recognizer processor accepts a linear sequence of inputs from one or more other pattern recognizer processors and triggers one or more simulated axons of the pattern recognizer processor to generate a complex recognition output signal for the pattern recognizer processor if the respective probability threshold of the simulated axon is met by an output generated by processing the linear sequence of inputs in accordance with a respective weight for each of the inputs, and
where each pattern recognizer processor implements a hidden Markov model and the entire hierarchy of pattern recognizer processors implements a hierarchical hidden Markov model, and
a hidden Markov model processor configured to produce new levels of the hierarchy by adding pattern recognizer processors to the hierarchy.

2. The system of claim 1, wherein the first and the second complex recognition output signals each include a probability value or a probability value quantized to discrete levels.

3. The system of claim 1, wherein the first and the second complex recognition output signals each include a bundle of probability values or a bundle of probability values quantized to discrete levels.

4. The system of claim 1, wherein the first and the second complex recognition output signals each include a respective quantized vector.

5. The system of claim 1, wherein the parent pattern recognizer processor is configured to send one or more pattern expected signals to one or more respective lower level pattern recognizer processors when most of a pattern has been recognized, each pattern expected signals indicating that the rest of a pattern is expected by the parent pattern recognizer processor.

6. The system of claim 5, wherein the child pattern recognizer processor is configured to receive a pattern expected signal and in response lower a threshold for recognition of the child pattern recognizer processor.

7. The system of claim 5, wherein:
each pattern recognizer processor has one or more expected signal input channels; and
when an expected signal is received, the threshold for recognition of the pattern associated with this pattern recognizer processor is recomputed, and the re-computation of the probability takes into consideration additional information that is included in the expected signal input from the higher level pattern processor.

8. The system of claim 1, wherein a connection between the child pattern recognizer processor and the parent pattern recognizer processor provides additional information to the parent pattern recognizer processor, the additional information including one or more quantized vectors.

9. The system of claim 1, further comprising:
a critical thinking module that continually conducts background scans of patterns reviewing compatibility with the other patterns in the pattern recognizing engine.

10. The system of claim 1, further comprising:
a genetic algorithm processor that implements genetic algorithm-based techniques to determine values for parameters of the multiple pattern recognizer processors.

11. The system of claim 10, wherein the genetic algorithm processor implements genetic algorithm-based techniques to determine and update one or more initial parameters that are used by the pattern recognizing engine.

12. The system of claim 10, wherein the parameters set by the genetic algorithm processor include redundancy rules to limit memory and processing resources devoted to redundant processing or storage of patterns.

13. The system of claim 10, wherein the parameters set by the genetic algorithm processor include recognition thresholds.

14. The system of claim 10, wherein:
the child pattern recognizer processor is configured to receive a pattern expected signal and in response lower a threshold for recognition of the child pattern recognizer processor; and
the parameters set by the genetic algorithm processor include a parameter controlling an amount by which the child pattern recognizer processor lowers the threshold for recognition of the child pattern recognizer.

15. The system of claim 1, wherein connections between the parent pattern recognizer processor and the child pattern recognizer processor include a network of one or more probabilities or quantized vectors, wherein the network of probabilities represents a hierarchical hidden Markov model.

16. The system of claim 1, wherein the parent pattern recognizer processors receives an input from the child pattern recognizer processor and represents a parent pattern that includes a pattern of the child pattern recognizer processor as a sub-pattern.

17. The system of claim 1, wherein the pattern recognizing engine models a pattern as a multi-dimensional input of lower level patterns, a pattern name, and a set of higher level patterns that the pattern is part of.

18. The system of claim 1, wherein:
the inputs in the linear sequence of inputs have one or more magnitude parameters, having a first magnitude parameter that indicates an expected magnitude of the input and a second magnitude parameter that indicates an expected variability of the magnitude of the input.

19. The system of claim 1, wherein the pattern recognizing engine is configured to recognize one or more repeated patterns of multiple patterns recognized by the pattern recognizer processors and to set up a new pattern recognizer processor at one level higher than a current highest level in the hierarchy to recognize each of the one or more repeated patterns.

20. The system of claim 19, wherein a repeated pattern includes a pattern represented in part by a lower level pattern recognizer processor at the highest level of the hierarchy of processors prior to a new processor being added for the new pattern.

21. The system of claim 1, wherein:
the multiple pattern recognizer processors comprise a first pattern recognizer processor, wherein the first pattern recognizer processor is configured to make small random changes to received input.

22. A computer system comprising:
a pattern recognizing engine, comprising:
multiple pattern recognizer processors configured to dynamically form a hierarchy, each pattern recognizer processor being implemented on a processing device having memory and storage, each pattern recognizer processor being configured with recognition software that when executed recognizes specific patterns, where each pattern recognizer processor has one or more simulated axons that each have a respective probability threshold, and each pattern recognizer processor accepts a linear sequence of inputs from one or more other pattern recognizer processor and triggers one or more simulated axons of the pattern recognizer processor to generate a complex recognition output signal for the pattern recognizer processor if the respective probability threshold of the simulated axon is met by an output generated by processing the linear sequence of inputs in accordance with a respective weight for each of the inputs, and where each pattern recognizer processor implements a hidden Markov model and the entire hierarchy of pattern recognizer processors implements a hierarchical hidden Markov model;
a hidden Markov model processor configured to produce new levels of the hierarchy by adding pattern recognizer processors to the hierarchy, to control production of new levels of hierarchy as needed, and to prune connections, wherein producing new levels and pruning connection is done at least in part by adjusting connection weights between pattern recognizer processors; and
one or more input processors configured to receive inputs and to bootstrap the pattern recognizing engine with previously trained hierarchical networks.

23. The system of claim 22, wherein the system is configured to incorporate patterns and connection probabilities of other systems.

24. The system of claim 22, wherein the system is configured to receive trained information about hierarchical relationships from another system and translate the information about hierarchical relationships into the hierarchical relationships of the system.

25. The system of claim 22, wherein the pattern recognizer processors are self-organizing and configured to be able to adjust the hierarchy.

* * * * *